United States Patent
Wang et al.

(10) Patent No.: US 11,618,794 B2
(45) Date of Patent: Apr. 4, 2023

(54) LONG CHAIN BRANCHED PROPYLENE POLYMER COMPOSITION

(71) Applicant: Borealis AG, Vienna (AT)

(72) Inventors: Jingbo Wang, Linz (AT); Markus Gahleitner, Linz (AT); Pauli Leskinen, Porvoo (FI); Klaus Bernreitner, Linz (AT); Katja Ellen Klimke, Linz (AT); Markku Vahteri, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 17/623,300

(22) PCT Filed: Jun. 19, 2020

(86) PCT No.: PCT/EP2020/067137
§ 371 (c)(1),
(2) Date: Dec. 28, 2021

(87) PCT Pub. No.: WO2021/001176
PCT Pub. Date: Jan. 7, 2021

(65) Prior Publication Data
US 2022/0204665 A1 Jun. 30, 2022

(30) Foreign Application Priority Data
Jul. 4, 2019 (EP) .................................. 19184439

(51) Int. Cl.
C08F 210/06 (2006.01)
(52) U.S. Cl.
CPC ........ *C08F 210/06* (2013.01); *C08F 2810/10* (2013.01)
(58) Field of Classification Search
CPC .... C08F 110/06; C08F 2/001; C08F 4/65904; C08F 4/65912; C08F 4/65927; C08F 10/00; C08F 110/14; C08F 110/02; C08F 2/38; C08F 4/65916; C08F 4/6498; C08F 4/64148; C08F 2500/03; C08F 4/6495
See application file for complete search history.

(56) References Cited

U.S. PATENT DOCUMENTS

| | | | | |
|---|---|---|---|---|
| 10,072,107 B2 * | 9/2018 | Bader | .................. | C08F 4/65904 |
| 2018/0319907 A1 * | 11/2018 | Hagadorn | ............. | C08F 110/02 |

FOREIGN PATENT DOCUMENTS

| | | | |
|---|---|---|---|
| EP | 0887379 | A1 | 12/1998 |
| EP | 1828266 | A1 | 9/2007 |
| EP | 2492293 | A1 | 8/2012 |
| EP | 2520425 | A1 | 11/2012 |
| EP | 3018153 | A1 | 5/2016 |
| EP | 3018154 | A1 | 5/2016 |
| WO | 9212182 | A1 | 7/1992 |
| WO | 9414856 | A1 | 7/1994 |
| WO | 9512622 | A1 | 5/1995 |
| WO | 9924478 | A1 | 5/1999 |
| WO | 9924479 | A1 | 5/1999 |
| WO | 0068315 | A1 | 11/2000 |
| WO | 2002002576 | A1 | 1/2002 |
| WO | 2004000899 | A1 | 12/2003 |
| WO | 2004111095 | A1 | 12/2004 |
| WO | 2006060544 | A1 | 6/2006 |
| WO | 2006097497 | A1 | 9/2006 |
| WO | 2007116034 | A1 | 10/2007 |
| WO | 2011076780 | A1 | 6/2011 |
| WO | 2011135004 | A2 | 11/2011 |
| WO | 2012001052 | A2 | 1/2012 |
| WO | 2012084961 | A1 | 6/2012 |
| WO | 2013007650 | A1 | 1/2013 |
| WO | 2014016205 | A1 | 1/2014 |
| WO | 2015158790 | A2 | 10/2015 |
| WO | 2016126429 | A1 | 8/2016 |
| WO | 2016126430 | A1 | 8/2016 |
| WO | 2018122134 | A1 | 7/2018 |

OTHER PUBLICATIONS

International Search Report and Written Opinion for PCT/EP2020/067137 dated Sep. 2, 2020, 14 pages.
Notification of Transmittal of the International Preliminary Report on Patentability for PCT/EP2020/067137 dated Jul. 1, 2021, 64 pages.
Extended European Search Report for 19184439.8 dated Jan. 27, 2020, 8 pages.
Castignolles, et al., "Detection and quantification of branching in polyacrylates by size-exclusion chromatography (SEC) and melt-state 13C NMR spectroscopy," Polymer, vol. 50, 2009, pp. 2373-2383.
Filip, et al., "Heteronuclear decoupling under fast MAS by a rotor-synchronized Hahn-echo pulse train," Journal of Magnetic Resonance, vol. 176, 2005, pp. 239-243.
Griffin, et al., "Low-load Rotor-Synchronised Hahn-echo Pulso Train (RS-HEPT) 1H Decoupling in Solid-State NMR: factors affecting MAS Spin-echo Dephasing Times",. Magnetic Resonance in Chemistry, 2007; 45: S198-S208, Published online in Wiley Interscience.
Klimke, et al., "Optimisation and Application of Polyolefin Branch Quantification by Melt-State 13C NMR Spectroscopy," Macromolecular Chemistry and Physics, vol. 207, 2006, pp. 382-395.
Parkinson, et al., "Effect of Branch Length on 130 NMR Relaxation Properties in Moten Poly[ethylene-co-(x-olefin)] Model Systems," Macromolecular Chemistry and Physics, vol. 208, 2007, pp. 2128-2133.

(Continued)

*Primary Examiner* — Robert D Harlan
(74) *Attorney, Agent, or Firm* — Lowenstein Sandler LLP

(57) ABSTRACT

The present invention relates to a propylene polymer composition comprising a long chain branched propylene polymer, wherein said propylene polymer composition has a) a crystallization temperature Tc of less than 115° C., b) a melting temperature Tm of less than 155° C. c) a F30 melt strength of from 5.0 to less than 30.0 cN, and d) a V30 melting extensibility of more than 190 mm/s, a process for producing said propylene polymer composition by reactive modification of a propylene polymer in the presence of a peroxide, an article comprising said propylene polymer composition, the use of said propylene polymer composition for producing an article.

10 Claims, No Drawings

(56) References Cited

OTHER PUBLICATIONS

Wagner, et al., "Rheotens-Mastercurves and Drawability of Polymer Melts," Polymer Engineering and Science, 1996, vol. 36, No. 7, pp. 925-935.
Pollard, et al., "Observation of Chain Branching in Polyethylene in the Solid State and Melt via 13C NMR Spectroscopy and Melt NMR Relaxation Time Measurements," Macromolecules, vol. 37, 2004, pp. 813-825.
Resconi, et al., "Selectivity in Propene Polymerization with Metallocene Catalysts," Chem. Rev., 2000, vol. 100, pp. 1253-1345.
Response to Written Opinion for PCT/EP2020/067137 dated Apr. 19, 2021, 3 pages.
Office Action with English Translation for Japanese Patent Application No. 2021578164 dated Jun. 14, 2022, 4 pages.

\* cited by examiner

LONG CHAIN BRANCHED PROPYLENE POLYMER COMPOSITION

CROSS-REFERENCE TO RELATED APPLICATION(S)

The present application is a national stage entry under 35 U.S.C. § 371 of International Application No. PCT/EP2020/067137, filed on Jun. 19, 2020, which claims priority to European Patent Application No. 19184439.8, filed on Jul. 4, 2019. The contents of these applications are hereby incorporated by reference in their entirety.

FIELD OF THE INVENTION

The present invention relates to a propylene polymer composition comprising a long chain branched propylene copolymer, a process for preparing such a propylene polymer composition by means of post reactor modification of the propylene copolymer, an article comprising such a propylene polymer composition, the use of such a propylene polymer composition for the production of an article and the use of such a process for preparing a propylene polymer composition comprising a long chain branched propylene polymer for increasing the melt strength of a propylene polymer composition.

BACKGROUND ART

Propylene homopolymers and copolymers are suitable for many applications such as packaging, textile, automotive, laboratory equipment and pipe. These polymers present a variety of properties such as for example high modulus, tensile strength, rigidity and heat resistance. These properties make polypropylenes very attractive materials in numerous applications such as for example films, foams, moulded articles or articles in automotive applications.

Light weight constructions are an everlasting topic in these applications, as solutions with higher stiffness are sought in order to reduce the usage of materials This is not only cost driven but also to reduce the consumption of raw materials and reduce the damage to the environment. The most relevant approach for reducing material density is foaming, for which, however, propylene polymers with linear chain structure are not well suited. Another important feature is thermal resistance. Many applications, especially in the moulding area, require higher thermal resistance in order to fill the article with hot food; therefore the heat distortion temperature (HDT) is crucial. Higher HDT is obviously beneficial especially for moulding application especially in the field of packaging.

This objective can be reached by subjecting the polypropylene to a post-reactor modification process such as for example a high melt strength (HMS) process. This process generates branching in the polypropylene material resulting in long-chain branched polypropylene. The long-chain branching is generally associated with improved melt-strength. These long-chain branched polypropylenes are therefore often used for making foams.

A challenge within the field of existing long-chain branched polypropylenes and their compositions is that their production generally leads to the formation of gels. Gel formation results in undesirable low melt strength in the polypropylene, limited mechanical performance and poor appearance of the articles based on it. Gel formation is reflected by the so-called xylene hot insoluble (XHU) fraction. Thus, there is a wish to improve polypropylene with high melt strength with respect to its gel content. By such an improvement, the articles obtained when using such a polypropylene will have improved and highly desirable properties such as improved stiffness, higher thermal resistance and superior appearance.

WO 2014/0016205 (in the name of BOREALIS AG) describes a high melt strength (HMS) post-reactor modification process wherein peroxide and butadiene are used to make long-chain branched polypropylene (b-PP) materials. The long-chain branched polypropylenes in WO 2014/0016205 are used to prepare foams with reduced gel content. For the preparation of the long-chain branched polypropylene in WO 2014/0016205 a specific polypropylene is used as base material.

EP 3 018 153 A1 and EP 3 018 154 A1 also describe a high melt strength (HMS) post-reactor modification process wherein peroxide and butadiene are used to make long-chain branched polypropylene (b-PP) materials for film and foam applications. The propylene polymer to be modified in said high melt strength (HMS) post-reactor modification process is polymerized in the presence of a catalyst system free of phthalates.

It is disclosed for these processes that for obtaining a long chain branched propylene polymer composition with a desired melt flow rate (MFR) range a base polypropylene material with a very low MFR has to be used for the preparation of the long-chain branched polypropylene, as the modification process described in these documents generally increases the MFR of the long chain branched propylene polymer composition compared to the base polypropylene material. Some of the disadvantages of this method are the necessary restriction to a certain MFR range of the base polypropylene and further the limitation to reach any desired MFR of the long-chain branched polypropylene composition. Therefore there still exists a need to improve the properties of the long-chain branched polypropylene material, more specifically its gel content and to improve the mechanical properties such as the stiffness and thermal resistance of the resultant long-chain branched polypropylene compositions.

It has surprisingly been found that by means of a modified high melt strength (HMS) post-reactor modification process a propylene polymer composition comprising a long-chain branched propylene copolymer can be produced which show the desired improvement in heat resistance and mechanical properties. Preferably, a carefully designed reactor made copolymer of propylene and comonomer units selected from alpha olefins having from 4 to 12 carbon atoms which is introduced to said modified process can contribute to obtaining a propylene polymer composition with said properties.

SUMMARY OF THE INVENTION

The present invention relates to a propylene polymer composition comprising a long chain branched propylene copolymer, wherein said propylene polymer composition has
a) a crystallization temperature Tc of less than 115° C.,
b) a melting temperature Tm of less than 155° C.
c) a F30 melt strength of from 5.0 to less than 30.0 cN, and
d) a V30 melting extensibility of more than 190 mm/s.

The present invention further relates to a process for producing a propylene polymer composition comprising the following steps:

a) Polymerizing propylene and comonomers selected from alpha-olefins having from 4 to 12 carbon atoms in the presence of a single site catalyst system to produce a propylene copolymer;
b) Recovering the propylene copolymer;
c) Extruding the propylene copolymer in the presence of a peroxide for introducing long chain branching into the propylene copolymer;
d) Recovering the propylene polymer composition.

Further, the present invention relates to an article comprising the propylene polymer composition as defined above or below Additionally, the present invention relates to the use of the propylene polymer composition as defined above or below for the production of an article.

Finally, the present invention relates to the use of the process as defined above or below for increasing the melt strength of a propylene polymer composition.

Definitions

According to the present invention, the expression "propylene homopolymer" relates to a polypropylene that consists substantially, i.e. of at least 99.0 wt %, more preferably of at least 99.5 wt %, still more preferably of at least 99.8 wt %, like at least 99.9 wt % of propylene units. In another embodiment, only propylene units are detectable, i.e. only propylene has been polymerized.

According to the present invention, the expression "propylene copolymer" relates to a polypropylene which comprises propylene monomer units and comonomer units, preferably selected from $C_4$-$C_{12}$ alpha-olefins. The amount of comonomer units in the propylene copolymer is at least 0.1 wt %, preferably at least 0.2 wt %, still more preferably at least 0.5 wt %. In the present invention the amount of comonomer units in the propylene copolymer suitably exceeds 0.5 wt %.

A propylene random copolymer is a copolymer of propylene monomer units and comonomer units, in the present invention preferably selected from $C_4$-$C_{12}$ alpha-olefins, in which the comonomer units are distributed randomly over the polymeric chain. The propylene random copolymer can comprise comonomer units from one or more comonomers different in their amounts of carbon atoms. A propylene random copolymer does not include an elastomeric phase.

Percentages are usually given herein as weight-% (wt %) if not stated otherwise.

DETAILED DESCRIPTION OF THE INVENTION

Propylene Polymer Composition

The present invention relates to a propylene polymer composition comprising a long chain branched propylene copolymer, wherein said propylene polymer composition has
a) a crystallization temperature Tc of less than 115° C.,
b) a melting temperature Tm of less than 155° C.
c) a F30 melt strength of from 5.0 to less than 30.0 cN, and
d) a V30 melting extensibility of more than 190 mm/s.

The propylene polymer composition can comprise the long chain branched propylene copolymer together with other compounds selected from additives and or polymers. The propylene polymer composition preferably comprises, more preferably consists of the long chain branched propylene copolymer as only polymeric component and optional additives.

The propylene polymer composition according to the invention preferably is a propylene copolymer composition.

Illustrative additives to be used in the propylene polymer composition of the present invention include, but are not limited to, stabilizers such as antioxidants (for example sterically hindered phenols, phosphites/phosphonites, sulphur containing antioxidants, alkyl radical scavengers, aromatic amines, hindered amine stabilizers, or blends thereof), metal deactivators (for example Irganox® MD 1024), or UV stabilizers (for example hindered amine light stabilizers). Other typical additives are modifiers such as antistatic or antifogging agents (for example ethoxylated amines and amides or glycerol esters), acid scavengers (for example Ca-stearate), blowing agents, cling agents (for example polyisobutene), lubricants and resins (for example ionomer waxes, polyethylene- and ethylene copolymer waxes, Fischer-Tropsch waxes, montan-based waxes, fluoro-based compounds, or paraffin waxes), nucleating agents (for example talc, benzoates, phosphorous-based compounds, sorbitoles, nonitol-based compounds or amide-based compounds), as well as slip and antiblocking agents (for example erucamide, oleamide, talc, natural silica and synthetic silica or zeolites) and mixtures thereof.

Generally the total amount of additives in the propylene polymer composition is not more than 5.0 wt %, preferably not more than 1.0 wt %, like in the range of 0.005 to 0.995 wt %, more preferably not more than 0.8 wt %, based on the total weight of the propylene polymer composition.

Polymers to be used in the propylene polymer composition of the present invention preferably include thermoplastic polymers.

Preferably the total amount of additives, polymers and/or combinations thereof in the propylene polymer composition according to the invention is not more than 5.0 wt %, more preferably not more than 0.995 wt %, like in the range of 0.005 to 1.0 wt %, based on the total weight of the propylene polymer composition according to the invention.

The propylene polymer composition preferably does not contain fillers and/or reinforcement agents in an amount exceeding 5.0 wt.-%. In one embodiment the propylene polymer composition does not contain fillers and/or reinforcement agents.

Although not preferred the propylene polymer composition according to the invention can further comprise fillers and/or reinforcement agents. Fillers to be used in the long-chain branched polypropylene composition (b-PP-C) according to the invention include, but are not limited to talc, calcium carbonate, calcium sulphate, clay, kaolin, silica, glass, fumed silica, mica, wollastonite, feldspar, aluminium silicate, calcium silicate, alumina, hydrated alumina such as alumina trihydrate, glass microsphere, ceramic microsphere, wood flour, marble dust, magnesium oxide, magnesium hydroxide, antimony oxide, zinc oxide, barium sulphate and/or titanium dioxide. Reinforcement agents to be used in the propylene polymer composition according to the invention include, but are not limited to mineral fibers, glass fibers, carbon fibers, organic fibers and/or polymer fibers.

Preferably the total amount of additives, polymers, fillers, reinforcement agents and/or combinations thereof in the propylene polymer composition according to the invention is not more than 5.0 wt %, more preferably not more than 1.0 wt %, like in the range of 0.005 to 0.995 wt %, based on the total weight of the propylene polymer composition according to the invention.

The propylene polymer composition has a crystallization temperature Tc as determined by DSC of less than 115.0° C., more preferably of 90.0 to 114.0° C., still more preferably 95.0 to 112.0° C. and most preferably 98.5 to 111.0° C.

Further, the propylene polymer composition has a melting temperature Tm as determined by differential scanning calorimetry (DSC) of less than 155.0° C., preferably of 130.0 to 152.5° C., more preferably 132.5 to 150.0° C., and most preferably 135.0 to 145.0° C.

Still further, the propylene polymer composition has a F30 melt strength as determined by the Rheotens method of from 5.0 to less than 30.0 cN, preferably of from 5.5 to 28.0 cN, more preferably of from 6.0 to 26.0 cN and most preferably of from 10.0 to 21.0 cN.

Additionally, the propylene polymer composition has a V30 melting extensibility as determined by the Rheotens method of more than 190 mm/s, preferably 200 to 500 mm/s, more preferably 210 to 400 mm/s and most preferably 215 to 450 mm/s.

The propylene polymer composition preferably has a xylene hot insolubles (XHU) fraction in an amount of less than 1.00%, more preferably in an amount of from 0.05 to 0.95 wt %, still more preferably in an amount of from 0.08 to 0.90 wt % and most preferably in an amount of 0.10 to 0.80 wt %, based on the total weight amount of the propylene polymer composition.

Further, the propylene polymer composition preferably has a melt flow rate $MFR_2$ (230° C., 2.16 kg) of 1.0 to 30.0 g/10 min, more preferably of 1.2 to 20.0 g/10 min, still more preferably of 1.4 to 15.0 g/10 min, and most preferably of 2.2 to 12.5 g/10 min.

Additionally the propylene polymer composition preferably has a melting enthalpy Hm as determined by DSC of less than 105 J/g, more preferably in the range of from 85 to 102 J/g, still more preferably in the range of from 88 to 100 J/g and most preferably in the range of from 88 to 98 J/g.

Still further, the propylene polymer composition preferably has a xylene cold solubles (XCS) fraction in an amount of less than 3.0 wt %, preferably of from 0.5 to 2.8 wt %, more preferably of from 0.8 to 2.6 wt %, based on the total weight amount of the propylene polymer composition.

The propylene polymer composition according to the present invention surprisingly combines an improved balance of properties of good melt strength as can been seen in its F30 melt strength and V30 melting extensibility, a high crystallinity as can be seen in its melting temperature, melting enthalpy and crystallization temperature and low amount of XCS fraction and low gel content illustrated by the low amount of XHU fraction. The propylene polymer composition according to the present invention is therefore especially applicable for films, foams and moulded articles especially in light weight applications, automotive applications and packaging applications, such as food packaging applications.

The propylene polymer composition according to the invention as defined above or below is prepared a modified high melt strength (HMS) post-reactor modification process in which long chain branching is introduced into a propylene copolymer.

Process

The present invention further relates to a process for producing a propylene polymer composition comprising the following steps:
a) Polymerizing propylene and comonomers selected from alpha-olefins having from 4 to 12 carbon atoms in the presence of a single site catalyst system to produce a propylene copolymer;
b) Recovering the propylene copolymer;
c) Extruding the propylene copolymer in the presence of a peroxide for introducing long chain branching into the propylene copolymer;
d) Recovering the propylene polymer composition.

Thereby, the propylene polymer composition resulting from said process is preferably defined as the propylene polymer composition according to the invention as defined above or below.

Polymerization of the Propylene Copolymer

The propylene copolymer polymerized in process step a) is a copolymer of propylene with at least one comonomer selected from alpha olefins having from 4 to 12 carbon atoms.

Preferred comonomers are comonomers selected from alpha olefins having from 4 to 8 carbon atoms. Especially preferred are comonomers selected from 1-butene and 1-hexene. Mostly preferred is 1-hexene.

The propylene copolymer is preferably a propylene/1-hexene copolymer or propylene/1-butene copolymer, most preferably a propylene/1-hexene copolymer.

The propylene copolymer is preferably a propylene random copolymer, i.e. a propylene copolymer with the comonomer(s) as defined above or below randomly distributed in the polymeric chain.

The amount of comonomer in the copolymer of propylene is preferably from more than 0.5 wt % to 10.0 wt %, preferably from 0.8 to 8.0 wt %, still more preferably from 1.0 to 6.5 wt % and most preferably from 1.5 to 5.0 wt %, based on the total amount of monomer units in the propylene copolymer.

The propylene copolymer can be produced in a sequential step process, using reactors in serial configuration and operating at different reaction conditions. As a consequence, each fraction prepared in a specific reactor can have its own molecular weight distribution and/or comonomer content distribution depending on the type of propylene copolymer produced. When the distribution curves (molecular weight or comonomer content) from these fractions are superimposed to obtain the molecular weight distribution curve or the comonomer content distribution curve of the final copolymer, these curves may show two or more maxima or at least be distinctly broadened when compared with curves for the individual fractions. Such a copolymer, produced in two or more serial steps, is called bimodal or multimodal, depending on the number of steps. Accordingly the propylene copolymer may be multimodal, like bimodal, in view of the molecular weight and/or comonomer content depending on the type of propylene copolymer.

In case the propylene copolymer is of multimodal, like bimodal, character, in view of the comonomer content, it is appreciated that the individual fractions are present in amounts influencing the properties of the material. Accordingly it is appreciated that each of these fractions is present in an amount of at least 10 wt % based on the propylene copolymer. Accordingly in case of a bimodal system, in particular in view of the comonomer content, the split of the two fractions is preferably 40:60 to 60:40, like roughly 50:50.

The propylene polymer fractions in the multimodal or bimodal propylene copolymer can be a combination of only propylene copolymers which may differ in the amount and/or nature of the comonomer(s). The propylene polymer fractions in the multimodal or bimodal propylene copolymer can be a combination of propylene homopolymer(s) and propylene copolymer(s). Thereby, if more than one propylene copolymer is present, the propylene copolymers may differ in the amount and/or nature of the comonomer(s).

Polymerization processes, which are suitable for producing the propylene polymer are known in the state of the art and comprise at least one polymerization stage, where polymerization is typically carried out in solution, slurry, bulk or gas phase. Typically the polymerization process comprises additional polymerization stages or reactors. In one particular embodiment the process contains at least one bulk reactor zone and at least one gas phase reactor zone, each zone comprising at least one reactor and all reactors being arranged in cascade. In one particularly preferred embodiment the polymerization process comprises at least one bulk reactor and at least one gas phase reactor arranged in that order. In some preferred processes the process comprises one bulk reactor and at least two, e.g. two or three gas phase reactors. The process may further comprise pre- and post-reactors. Pre-reactors comprise typically pre-polymerization reactors. In this kind of processes the use of higher polymerization temperatures is preferred in order to achieve specific properties of the polymer. Typical temperatures in these processes are 70° C. or higher, preferably 80° C. or higher, even 85° C. or higher. The higher polymerization temperatures as mentioned above can be applied in some or all reactors of the reactor cascade.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315. A further suitable slurry-gas phase process is the Spheripol® process of Basell.

Suitably a specific type of single site catalyst system is used for polymerizing the propylene polymer. It is especially preferred that the single site catalyst system is a supported single site catalyst system, such as a silica supported single site catalyst system. The single catalyst system suitably comprises a specific class of metallocene complexes in combination with an aluminoxane cocatalyst and a silica support. The metallocene catalyst complexes are either symmetrical or asymmetrical. Asymmetrical means simply that the two ligands forming the metallocene are different, that is, each ligand bears a set of substituents that are chemically different. The metallocene catalyst complexes preferably are chiral, racemic bridged bisindenyl metallocenes in their anti-configuration. The metallocenes preferably are either C2-symmetric or C1-symmetric. When they are C1-symmetric they still maintain a pseudo-C2-symmetry since they maintain C2-symmetry in close proximity of the metal center, although not at the ligand periphery. By nature of their chemistry, both a meso form and a racemic enantiomer pair (in case of C2-symmetric complexes) or anti and syn enantiomer pairs (in case of C1-symmetric complexes) are formed during the synthesis of the complexes. Thereby, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the Figure below.

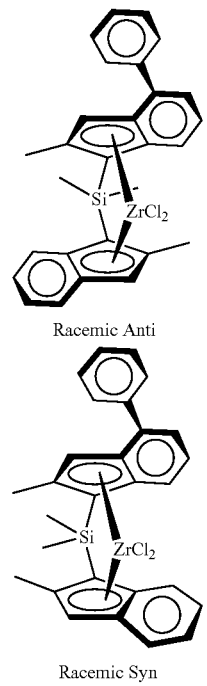

Racemic Anti

Racemic Syn

Formula (I), and any sub formulae, are intended to cover both syn- and anti-configurations. Preferred metallocene catalyst complexes are in the anti configuration.

The metallocene catalyst complexes are preferably employed as the racemic-anti isomers. Ideally, therefore at least 95 mol %, such as at least 98 mol %, especially at least 99 mol % of the metallocene catalyst complex is in the racemic-anti isomeric form.

In the metallocene catalyst complexes, the following preferences apply. Metallocene catalyst complexes are preferably of formula (I):

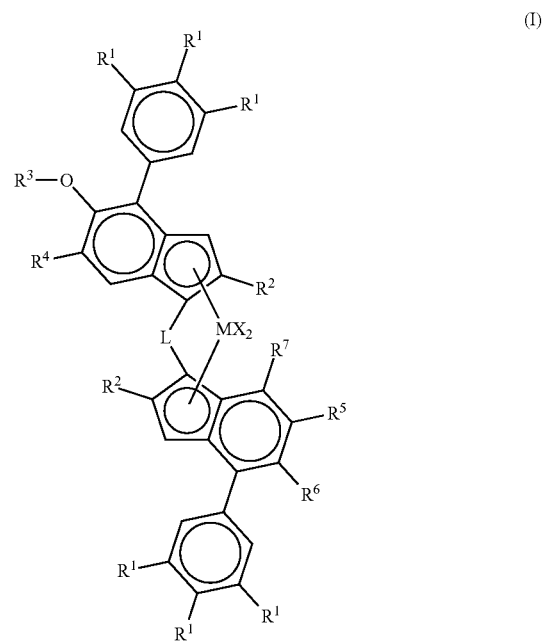

M is either Zr or Hf, preferably Zr.

Each X independently is a sigma-donor ligand.

Thus each X may be the same or different, and is preferably a hydrogen atom, a halogen atom, a linear or branched, cyclic or acyclic $C_{1-20}$-alkyl or -alkoxy group, a $C_{6-20}$-aryl group, a $C_{7-20}$-alkylaryl group or a $C_{7-20}$-arylalkyl group; optionally containing one or more heteroatoms of Group 14-16 of the periodic table.

The term halogen includes fluoro, chloro, bromo and iodo groups, preferably chloro groups.

The term heteroatoms belonging to groups 14-16 of the periodic table includes for example Si, N, O or S.

More preferably, each X is independently a hydrogen atom, a halogen atom, a linear or branched $C_{1-6}$-alkyl or $C_{1-6}$-alkoxy group, a phenyl or benzyl group.

Yet more preferably, each X is independently a halogen atom, a linear or branched $C_{1-4}$-alkyl or $C_{1-4}$-alkoxy group, a phenyl or benzyl group.

Most preferably, each X is independently chlorine, benzyl or a methyl group.

Preferably, both X groups are the same.

The most preferred options for both X groups are two chlorides, two methyl or two benzyl groups.

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring. The term heteroatoms belonging to groups 14-16 of the periodic table includes for example Si, N, O or S.

Preferably L is —R'$_2$Si—, ethylene or methylene.

In the formula —R'$_2$Si—, each R' is preferably independently a $C_{1-20}$-hydrocarbyl group. The term $C_{1-20}$-hydrocarbyl group therefore includes $C_{1-20}$-alkyl, $C_{2-20}$-alkenyl, $C_{2-20}$-alkynyl, $C_{3-20}$-cycloalkyl, $C_{3-20}$-cycloalkenyl, $C_{6-20}$-aryl groups, $C_{7-20}$-alkylaryl groups or $C_{7-20}$-arylalkyl groups or of course mixtures of these groups such as cycloalkyl substituted by alkyl. Unless otherwise stated, preferred $C_{1-20}$-hydrocarbyl groups are $C_{1-20}$-alkyl, $C_{4-20}$-cycloalkyl, $C_{5-20}$-cycloalkyl-alkyl groups, $C_{7-20}$-alkylaryl groups, $C_{7-20}$-arylalkyl groups or $C_{6-20}$-aryl groups.

Preferably, both R' groups are the same. It is preferred if R' is a $C_1$-$C_{10}$-hydrocarbyl or $C_6$-$C_{10}$-aryl group, such as methyl, ethyl, propyl, isopropyl, tertbutyl, isobutyl, $C_{3-8}$-cycloalkyl, cyclohexylmethyl, phenyl or benzyl, more preferably both R' are a $C_1$-$C_6$-alkyl, $C_{5-6}$-cycloalkyl or $C_6$-aryl group, and most preferably both R' are methyl or one is methyl and the other is cyclohexyl. Most preferably the bridge is —Si(CH$_3$)$_2$—.

Each $R^1$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, and optionally two adjacent $R^1$ groups can be part of a ring including the phenyl carbons to which they are bonded.

Preferably, each $R^1$ are independently the same or can be different and are hydrogen, or a linear or branched $C_1$-$C_6$-alkyl group, like methyl or tert.-butyl.

It is for example possible that the $C_4$-phenyl ring is unsubstituted (i.e. all 3 $R^1$ are hydrogen), or substituted in the para position only, like 4'-tert.-butyl phenyl, or disubstituted in the 3' and 5' position, like 3',5'-dimethylphenyl or 3',5'-ditert.-butylphenyl.

Furthermore, it is possible that both phenyl rings have the same substitution pattern or that the two phenyl rings have different substitution patterns.

Each $R^2$ independently are the same or can be different and are a CH$_2$—$R^8$ group, with $R^8$ being H or linear or branched $C_{1-6}$-alkyl group, $C_{3-8}$-cycloalkyl group, $C_{6-10}$-aryl group.

Preferably, both $R^2$ are the same and are a CH$_2$—$R^8$ group, with $R^8$ being H or linear or branched $C_1$-$C_4$-alkyl group, more preferably, both $R^2$ are the same and are a CH$_2$—$R^8$ group, with $R^8$ being H or linear or branched $C_1$-$C_3$-alkyl group. Most preferably, both $R^2$ are methyl.

$R^3$ is a linear or branched $C_1$-$C_6$-alkyl group, $C_{7-20}$-arylalkyl, $C_{7-20}$-alkylaryl group or $C_6$-$C_{20}$-aryl group.

$R^3$ is a preferably linear or branched $C_1$-$C_6$-alkyl group or $C_{6-20}$-aryl group, such as methyl, ethyl, n-propyl, i-propyl, n-butyl, i-butyl, sec.-butyl and tert.-butyl, preferably a linear $C_1$-$C_4$-alkyl group, more preferably a $C_1$-$C_2$-alkyl group and most preferably methyl.

$R^4$ is a C($R^9$)$_3$ group, with $R^9$ being a linear or branched $C_1$-$C_6$-alkyl group.

Preferably each $R^9$ are the same or different with $R^9$ being a linear or branched $C_1$-$C_4$-alkyl group, more preferably with $R^9$ being the same and being a $C_1$-$C_2$-alkyl group. Most preferably, $R^4$ is a tert.-butyl group and hence all $R^9$ groups are methyl.

In one embodiment $R^5$ and $R^6$ independently are the same or can be different and are hydrogen or an aliphatic $C_1$-$C_{20}$-hydrocarbyl group optionally containing one or more heteroatoms from groups 14-16 of the periodic table of elements, like an alkyl or alkoxy group, e.g. a $C_1$-$C_{10}$-alkyl or -alkoxy group.

Preferably, $R^5$ and $R^6$ independently are the same or can be different and are hydrogen or a linear or branched $C_1$-$C_6$ alkyl group, or a $C_1$-$C_6$-alkoxygroup.

More preferably, $R^5$ and $R^6$ independently are the same or can be different and are hydrogen or a linear or branched $C_1$-$C_4$-alkyl group or a $C_1$-$C_4$-alkoxygroup.

In another embodiment $R^5$ and $R^6$ can be joined as parts of the 5-membered ring condensed with indenyl ring which is optionally substituted by n groups $R^{10}$, n being from 0 to 4, preferably 0 or 2 and more preferably 0;

whereby each $R^{10}$ can be the same or different and may be a $C_1$-$C_{20}$-hydrocarbyl group, or a $C_1$-$C_{20}$-hydrocarbyl radical optionally containing one or more heteroatoms belonging to groups 14-16 of the periodic table of elements; preferably a linear or branched $C_1$-$C_6$-alkyl group.

$R^7$ is H or a linear or branched $C_1$-$C_6$-alkyl group or an aryl or heteroaryl group having 6 to 20 carbon atoms optionally substituted by 1 to 3 groups $R^{11}$. Preferably, $R^7$ is H or an aryl group having 6 to 10 carbon atoms optionally substituted by 1 to 3 groups $R^{11}$, more preferably $R^7$ is H or a phenyl group optionally substituted by 1 to 3 groups $R^{11}$.

In case $R^7$ is an optionally substituted aryl group having 6 to 10 carbon atoms, like phenyl, each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group.

Preferably, each $R^{11}$ are independently the same or can be different and are hydrogen, a linear or branched $C_1$-$C_6$-alkyl group or $C_{6-20}$-aryl groups or an OY-group, wherein Y is a $C_{1-4}$-hydrocarbyl group. More preferably, each $R^{11}$ are independently the same or can be different and are hydrogen or a linear or branched $C_1$-$C_4$-alkyl group or an OY-group, wherein Y is a $C_{1-4}$-hydrocarbyl group. Even more preferably, each $R^{11}$ are independently the same or can be different and are hydrogen, methyl, ethyl, isopropyl, tert.-butyl or methoxy, especially hydrogen, methyl or tert.-butyl.

If the aryl group, like the phenyl group is substituted, it is preferably substituted by 1 or 2 $R^H$ groups. More preferably the phenyl group is substituted by 2 groups $R^{11}$, even more preferably both $R^{11}$ groups are the same, like 3',5'-dimethyl.

Particularly preferred complexes of the invention include:
rac-dimethylsilanediyl-bis-[2-methyl-4-(3'5' dimethylphenyl)-5-methoxy-6-tert-butylinden-1-yl] zirconium dichloride,
rac-anti-dimethylsilanediyl[2-methyl-4-(4'-tert.-butylphenyl)-inden-1-yl][2-methyl-4-(4'-tert.-butylphenyl)-5-methoxy-6-tert-butylinden-1-yl] zirconium dichloride,
rac-anti-dimethylsilanediyl[2-methyl-4-(4'-tert.-butylphenyl)-inden-1-yl][2-methyl-4-phenyl-5-methoxy-6-tert-butylinden-1-yl] zirconium dichloride,
rac-anti-dimethylsilanediyl[2-methyl-4-(3',5'-tert-butylphenyl)-1,5,6,7-tetrahydro-s-indacen-1-yl][2-methyl-4-(3',5'-dimethyl-phenyl)-5-methoxy-6-tert-butylinden-1-yl] zirconium dichloride,
rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl] zirconium dichloride,
rac-anti-dimethylsilanediyl[2-methyl-4,8-bis-(3',5'-dimethylphenyl)-1,5,6,7-tetrahydro-s indacen-1-yl][2-methyl-4-(3',5'-dimethylphenyl)-5-methoxy-6-tert-butylinden-1-yl] zirconium dichloride,
rac-anti-dimethylsilanediyl[2-methyl-4,8-bis-(3',5'-dimethylphenyl)-1,5,6,7-tetrahydro-s-indacen-1-yl][2-methyl-4-(3',5'-ditert-butyl-phenyl)-5-methoxy-6-tert-butylinden-1-yl] zirconium dichloride,
or their Hf-analogues.

For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

The ligands required to form the complexes and hence catalysts can be synthesized by any process and the skilled organic chemist would be able to devise various synthetic protocols for the manufacture of the necessary ligand materials. For Example WO2007/116034 discloses the necessary chemistry. Synthetic protocols can also generally be found in WO2002/02576, WO2011/135004, WO2012/084961, WO2012/001052, WO2011/076780, WO2015/158790 and WO2018/122134. The examples section also provides the skilled person with sufficient direction.

To form an active catalytic species it is normally necessary to employ a cocatalyst as is well known in the art.

In the preferred single site catalyst system a cocatalyst system comprising an aluminoxane cocatalyst is used in combination with the above defined metallocene catalyst complex.

The aluminoxane cocatalyst can be one of formula (II):

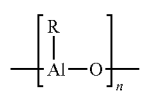   (II)

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$-alkyl, preferably $C_1$-$C_5$-alkyl, or $C_3$-$C_{10}$-cycloalkyl, $C_7$-$C_{12}$-arylalkyl or -alkylaryl and/or phenyl or naphthyl, and where Y can be hydrogen, halogen, preferably chlorine or bromine, or $C_1$-$C_{10}$-alkoxy, preferably methoxy or ethoxy.

The resulting oxygen-containing aluminoxanes are not in general pure compounds but mixtures of oligomers of the formula (II).

The preferred aluminoxane is methylaluminoxane (MAO).

Since the aluminoxanes used according to the invention as cocatalysts are not, owing to their mode of preparation, pure compounds, the molarity of aluminoxane solutions hereinafter is based on their aluminium content.

The cocatalyst system can also comprise a boron containing cocatalyst in combination with the aluminoxane cocatalyst.

Boron containing cocatalysts of interest include those of formula (III)

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are fluorine, trifluoromethyl, aromatic fluorinated groups such as p-fluorophenyl, 3,5-difluorophenyl, pentafluorophenyl, 3,4,5-trifluorophenyl and 3,5-di(trifluoromethyl)phenyl. Preferred options are trifluoroborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris (3,5-difluorophenyl)borane and/or tris (3,4,5-trifluorophenyl)borane.

Particular preference is given to tris(pentafluorophenyl)borane.

However it is preferred that borates are used, i.e. compounds containing a borate.

These compounds generally contain an anion of formula:

where Z is an optionally substituted phenyl derivative, said substituent being a halo-$C_{1-6}$-alkyl or halo group. Preferred options are fluoro or trifluoromethyl. Most preferably, the phenyl group is perfluorinated.

Such ionic cocatalysts preferably contain a weakly-coordinating anion such as tetrakis(pentafluorophenyl)borate or tetrakis(3,5-di(trifluoromethyl)phenyl)borate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include:
tributylammoniumtetra(pentafluorophenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl)borate, N,N-dimethylaniliniumtetrakis(pentafluorophenyl)borate, N,N-di(propyl)ammoniumtetrakis(pentafluorophenyl)borate, di(cyclohexyl)ammoniumtetrakist(pentafluorophenyl)borate, triphenylcarbeniumtetrakis(pentafluorophenyl)borate, or ferroceniumtetrakis(pentafluorophenyl)borate.

Preference is given to triphenylcarbeniumtetrakis(pentafluorophenyl) borate,

N,N-dimethylaniliniumtetrakis(pentafluorophenyl)borate,

N,N-dimethylcyclohexylammoniumtetrakis(pentafluorophenyl)borate or

N,N-dimethylbenzylammoniumtetrakis(pentafluorophenyl)borate.

It has been surprisingly found that certain boron containing cocatalysts are especially preferred. Preferred borates therefore comprise the trityl, i.e. triphenylcarbenium, ion. Thus, the use of $Ph_3CB(PhF_5)_4$ and analogues therefore are especially favoured.

Suitable amounts of cocatalyst will be well known to the person skilled in the art.

Preferably, the amount of cocatalyst is chosen to reach below defined molar ratios.

The molar ratio of Al from the aluminoxane to the metal ion (M) (preferably zirconium) of the metallocene Al/M may be in the range 1:1 to 2000:1 mol/mol, preferably 10:1 to 1000:1, and more preferably 50:1 to 600:1 mol/mol.

The molar ratio of feed amounts of optional boron (B) to the metal ion (M) (preferably zirconium) of the metallocene boron/M may be in the range 0.1:1 to 10:1 mol/mol, preferably 0.3:1 to 7:1, especially 0.3:1 to 5:1 mol/mol.

Even more preferably, the molar ratio of feed amounts of optional boron (B) to metal ion (M) (preferably zirconium) of the metallocene boron/M is from 0.3:1 to 3:1

The metallocene complex as described above is used in combination with a suitable cocatalyst combination as described above.

The preferred catalyst system is used in supported form. The particulate support material used is silica or a mixed oxide such as silica-alumina, in particular silica.

The use of a silica support is preferred. The skilled man is aware of the procedures required to support a metallocene catalyst.

Especially preferably, the support is a porous material so that the complex may be loaded into the pores of the particulate support, e.g. using a process analogous to those described in WO94/14856, WO95/12622, WO2006/097497 and EP18282666.

The average particle size of the silica support can be typically from 10 to 100 However, it has turned out that special advantages can be obtained, if the support has an average particle size from 15 to 80 preferably from 18 to 50 The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

The catalyst can contain from 10 to 100 μmol of transition metal per gram of silica, and 3 to 15 mmol of Al per gram of silica.

Preparation Steps:

Step a)

In step a) the silica support is reacted with aluminoxane cocatalyst.

Preferably, the reaction is done with the synthesis stoichiometry of Al in the aluminoxane to silica support in the range of 3-12 mmol Al/g $SiO_2$.

The silica support is preferably calcined before step a) for removing moisture from the surface thereof. The calcination temperature is normally in the range of from 200 to 800° C., preferably in the range of from 400 to 650° C.

The silica support is then suspended in a suitable hydrocarbon solvent, such as toluene. Suspending is done under inert gas atmosphere, e.g. under nitrogen, at a temperature of from 15° C. to 25° C.

The silica/solvent, preferably silica/toluene, suspension is stirred for some minutes, preferably for 5 to 60 minutes, more preferably from 10 to 30 minutes.

Then aluminoxane cocatalyst, preferably MAO (e.g. as a 30 wt % solution in toluene), is added to the silica/toluene suspension, preferably with a stoichiometry of 3-12 mmol Al/g SiO2.

It is preferred that not all of the aluminoxane cocatalyst is added in step a), but the main part of the total amount of aluminoxane cocatalyst. Thus 75.0 to 97.0 wt %, preferably 77.0 to 95.0 wt %, more preferably 85.0 to 92.0 wt %, of the total amount of aluminoxane cocatalyst are added in step a).

After addition of the aluminoxane cocatalyst the silica/solvent/aluminoxane mixture is heated up to a temperature in the range of from 80° C. to 120° C., preferably from 95° C. to 115° C. and more preferably from 100° C. to 110° C.

The mixture is stirred for some minutes up to several hours, preferably from 60 minutes up to 5 hours, more preferably from 90 minutes up to 3 hours, at this temperature.

Afterwards stirring is stopped, the so obtained slurry is allowed to settle and the mother liquor is removed, e.g. by filtering off or decantation.

Subsequently the remaining aluminoxane cocatalyst treated silica support is preferably washed one or more times, e.g. once or twice, more preferably twice with toluene and optionally one more time with heptane at elevated temperature in a range of from 70° C. to 115° C., preferably from 80° C. to 110° C. and more preferably from 90° C. to 100° C.

Preferably, the aluminoxane cocatalyst treated silica support is subsequently dried, preferably first at suitable temperatures, e.g. at 40 to 80° C., preferably at 50 to 70° C., more preferably at 58 to 62° C., under nitrogen atmosphere and subsequently under vacuum.

Step b)

In step b) the above defined metallocene complex of formula (I) is reacted with aluminoxane cocatalyst in a suitable hydrocarbon solvent, such as toluene.

Preferably, the same hydrocarbon solvent as in step a) is used.

In this step the remaining part of aluminoxane cocatalyst, preferably MAO (e.g. as a 30 wt % solution in toluene), i.e. 3.0 to 25.0 wt %, preferably 5.0 to 23.0 wt %, more preferably 8.0 to 13.0 wt %, of the total amount of aluminoxane cocatalyst are added in step b) to the metallocene complex of formula (I) and the so obtained solution is stirred for several minutes, preferably from 10 to 120 minutes, more preferably from 20 to 100 minutes and even more preferably from 40 to 80 minutes. Stirring is done at room temperature, e.g. at a temperature of from 15° C. to 25° C., preferably 18° C. to 22° C.

Optional Step c)

To the solution of metallocene/aluminoxane cocatalyst in a suitable hydrocarbon solvent, preferably in toluene, (prepared in step b) optionally the boron containing cocatalyst, like borate cocatalyst, if present in the single site catalyst system, is added to obtain a solution of metallocene complex of formula (I), boron containing cocatalyst and aluminoxane cocatalyst in a suitable hydrocarbon solvent, preferably in toluene.

The boron containing cocatalyst is added in an amount that a boron/M molar ratio of feed amounts in the range of 0.1:1 to 10:1 is reached. Preferably, the molar ratio of feed amounts boron/M is in the range of 0.3:1 to 7:1, more preferably 0.3:1 to 5.0:1, most preferably 0.3:1 to 3:1. M is Hf or Zr, preferably Zr.

The so obtained solution is further stirred for several minutes, preferably from 10 to 120 minutes, more preferably from 20 to 100 minutes and even more preferably from 40 to 80 minutes. Stirring is done at a temperature of from 15° C. to 25° C., preferably 18° C. to 22° C.

Optional Step d)

The solution obtained in step c) is then added to the aluminoxane cocatalyst treated support obtained in step a), yielding the supported catalyst system.

Steps c) and d) are applied for single site catalyst systems comprising a cocatalyst system comprising a boron containing cocatalyst in addition to the aluminoxane cocatalyst. For single site catalyst systems comprising a cocatalyst system only comprising an aluminoxane cocatalyst steps c) and d) are omitted.

Step e)

In the final step, the so obtained supported catalyst system can optionally be washed with an appropriate hydrocarbon solvent such as toluene or heptane and is then dried, preferably in vacuum to yield free flowing powder.

The amounts of silica support, aluminoxane, preferably MAO, optional boron containing cocatalyst and metallocene depend on the desired above defined ratios (Al/M, Al/SiO$_2$, M/SiO$_2$, optional boron/M; M being Hf or Zr, preferably Zr).

Recovered Propylene Copolymer

The propylene copolymer which is recovered from the polymerization step in step b) of the process of the invention is herein denoted "recovered propylene copolymer" or simply "propylene copolymer".

The propylene copolymer is preferably a propylene copolymer as described above.

Preferably the propylene copolymer has a xylene cold soluble (XCS) fraction measured according to ISO 16152 (25° C.) an amount of less than 3.5 wt %, more preferably from 0.2 to 3.0 wt %, still more preferably from 0.3 to 2.5 wt %, based on the total weight amount of the propylene polymer.

Further, the propylene copolymer preferably has a melt flow rate MFR$_2$ (230° C., 2.16 kg) of from 1.0 to 10.0 g/10 min, more preferably 1.2 to 8.0 g/10 min, still more preferably 1.4 to 7.5 g/10 min and most preferably 1.5 to 7.0 g/10 min.

The porosity and the specific pore volume of the inventive propylene copolymer are measured by mercury porosimetry according to DIN 66133 in combination with helium density measurement according to DIN 66137-2. The porosity is calculated by equation (II) as follows:

$$\text{Porosity [\%]} = [\text{specific pore volume}/(\text{specific pore volume} + 1/\text{density})] + 100 \quad \text{(II)}$$

The porosity of the inventive propylene copolymer is lower than 10.0%, preferably in the range of 0.2 to 9.0%, more preferably in the range of 0.4 to 8.0%. The specific pore volume of the inventive propylene copolymer is generally less than 0.12 cm$^3$/g, preferably less than 0.10 cm$^3$/g, more preferably less than 0.08 cm$^3$/g. In some embodiments the specific pore volume is not detectable.

According to the invention, the median particle size d50 and the top-cut particle size d95 of the propylene copolymer are measured by sieve analysis according to ISO 3310 and evaluated according to ISO 9276-2. The median particle size d50 is in the range of from 150 to 1000 μm, preferably 200 to 800 μm, still more preferably 250 to 600 μm and most preferably 275 to 500 μm. The top-cut particle size d95 is in the range of from 500 to 2500 μm, preferably 550 to 2000 μm, still more preferably 600 to 1500 μm and most preferably 650 to 900 μm.

The propylene copolymer can be unimodal or multimodal, in view of the molecular weight distribution and/or in view of the comonomer content distribution.

When the propylene copolymer is unimodal with respect to the molecular weight distribution and/or comonomer content, it may be prepared in a single stage process e.g. as slurry or gas phase process in respectively a slurry or gas phase reactor.

Preferably, the unimodal propylene copolymer is prepared in a slurry reactor. Alternatively, the unimodal propylene copolymer may be produced in a multistage process using at each stage, process conditions which result in similar polymer properties.

The expression "multimodal" or "bimodal" used herein refers to the modality of the polymer, i.e.

the form of the polymer's molecular weight distribution curve, which is the graphical representation of the molecular weight fraction as a function of its molecular weight or the form of the copolymer's comonomer content distribution curve, which is the graphical representation of the comonomer content as a function of the molecular weight of the polymer fractions.

As will be explained above, the polymer fractions of the propylene copolymer can be produced in a sequential step process, using reactors in serial configuration and operating at different reaction conditions. As a consequence, each fraction prepared in a specific reactor can have its own molecular weight distribution and/or comonomer content distribution depending on the type of propylene copolymer produced. When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a copolymer, produced in two or more serial steps, is called bimodal or multimodal, depending on the number of steps. Accordingly the propylene copolymer may be multimodal, like bimodal, in view of the molecular weight and/or comonomer content depending on the type of propylene polymer produced.

In case the propylene copolymer is of multimodal, like bimodal, character, in view of the comonomer content, it is appreciated that the individual fractions are present in amounts influencing the properties of the material. Accordingly it is appreciated that each of these fractions is present in an amount of at least 10 wt % based on the propylene copolymer. Accordingly in case of a bimodal system, in particular in view of the comonomer content, the split of the two fractions is preferably 40:60 to 60:40, like roughly 50:50.

According to one specific embodiment, the propylene copolymer is of multimodal in terms of comonomer content, i.e. comprising two or more fractions differing in comonomer content. Preferably, the propylene copolymer comprises one fraction having a relatively lower content of comonomer having been produced in a first reactor, one fraction having a relatively higher content of comonomer having been produced in a second reactor, and optionally a third fraction having been produced in a third reactor. Preferably, the weight ratio of the fraction having a relatively lower content of comonomer having been produced in a first reactor to the one fraction having a relatively higher content of comonomer having been produced in a second reactor optionally together with the third fraction having been produced in a third reactor, when present, is preferably in the range of from 30:70 to 60:40, more preferably in the range of from 33:67 to 50:50 and most preferably in the range of from 35:65 to 45:55.

The propylene copolymer is modified during an extrusion step in the presence of a peroxide in order to introduce long chain branching into the propylene copolymer in process step c) of the process of the invention.

Introduction of Long Chain Branching During Extrusion Step

The long-chain branching is introduced into the propylene by a reactive modification of the propylene copolymer. This reactive modification process is also part of the present invention. The reactive modification for producing the long-chain branched propylene copolymer is preferably performed by a reaction of the propylene copolymer with a thermally decomposing free radical-forming agent.

It is especially preferred that for the reactive modification no functionally unsaturated compound chosen from:
 a) at least one bifunctionally unsaturated monomer and/or polymer or
 b) at least one multifunctionally unsaturated monomer and/or polymer or
 c) a mixture of (a) and (b)
is present. "Bifunctionally unsaturated or multifunctionally unsaturated" as used above means the presence of respectively two or more non-aromatic double bonds. Examples are e.g. divinylbenzene, cyclopentadiene or polybutadiene.

The reactive modification step for producing a long-chain branched propylene copolymer preferably comprises the steps of: introducing the propylene copolymer recovered in process step b) of the process of the invention into a melt mixing device, further introducing a thermally decomposing free radical-forming agent such as a peroxide into said melt mixing device and melt mixing the propylene copolymer and the thermally decomposing free radical-forming agent in said melt mixing device at a barrel temperature in the range of 160 to 280° C., more preferably 170 to 270° C. and most preferably 180 to 235° C.

Suitably said melt mixing device is a continuous melt mixing device like for example a single screw extruder, a co-rotating twin screw extruder or a co-rotating kneader. Preferably, the melt mixing device includes a feed zone, a kneading zone and a die zone. More preferably, a specific temperature profile is maintained along the screw of the melt-mixing device, having an initial temperature T1 in the feed zone, a mid temperature T2 in the kneading zone and a final temperature T3 in the die zone, all temperatures being defined as barrel temperatures. Barrel temperature T1 (in the feed zone) is preferably in the range of 160 to 220° C. Barrel temperature T2 (in the kneading zone) is preferably in the range of 180 to 260° C. Barrel temperature T3 (in the die zone) is preferably in the range of 210 to 270° C. The screw speed of the melt mixing device can be adjusted depending on the material characteristics. The man skilled in the art is well familiar with this and can easily determine the appropriate screw speed. Generally the screw speed can be adjusted to a range from 100 to 750 rotations per minute (rpm), preferably to a range from 150 to 650 rotations per minute (rpm). Following the melt-mixing step, the resulting long-chain branched propylene copolymer melt can be pelletized, for example in an underwater pelletizer or after solidification of one or more strands in a water bath, in a strand pelletizer.

It is especially preferred that the propylene copolymer and the thermally decomposing free radical-forming agent are not premixed at a lower temperature in a premixing step before being introduced into the melt mixing device. It is further especially preferred that no functionally unsaturated compound as described above is added to the melt mixing device.

In the reactive modification for producing a long-chain branched propylene copolymer, the propylene copolymer is suitably mixed with 0.40 wt % to 4.00 wt % parts per weight (ppw) of peroxide per 100 parts per weight of propylene copolymer, preferably mixed with 0.50 to 3.50 parts per weight (ppw) of peroxide per 100 parts per weight of propylene copolymer, more preferably in the presence of 0.60 to 3.00 parts per weight (ppw) of peroxide per 100 parts per weight of propylene copolymer and most preferably in the presence of 0.70 to 2.00 parts per weight (ppw) of peroxide per 100 parts per weight of propylene copolymer.

The thermally decomposing free radical-forming agent usually is a peroxide.

For the present process the peroxide is preferably chosen as to have a half-time ($t_{1/2}$) of not more than 6 min at said above defined barrel temperature of 160 to 280° C. Thereby, the half-time is the time required to reduce the original peroxide content of a composition by 50%, at a given temperature and indicates the reactivity of said peroxide.

Preferred peroxides are selected from the group of dialkyl peroxides, such as dialkyl peroxydicarbonates. Suitable examples for dialkyl peroxydicarbonates are di-($C_{2-20}$)-alkyl peroxydicarbonates, preferably di-($C_{4-16}$)-alkyl peroxydicarbonates, more preferably di-($C_{8-14}$)-alkyl peroxydicarbonates. Especially preferred are di-(2-ethylhexyl) peroxydicarbonate, di-(4-tert-butylcyclohexyl) peroxycarbonate, dicetyl peroxydicarbonate, and dimyristyl peroxycarbonate. Especially preferred is dicetyl peroxydicarbonate.

During the extrusion and modification step c) also other components can be added to the melt mixing device such as the additives and/or polymeric compounds as described above. These optional components can be introduced into the melt mixing device via a side feeder for example.

From said extrusion and modification step c) as described above or below the propylene polymer composition is recovered.

Recovered Propylene Polymer Composition

The recovered propylene polymer composition of process step d) of the process according to the invention preferably has a lower melt flow rate $MFR_2$ (230° C., 2.16 kg) compared to the recovered propylene polymer of process step b).

This is insofar surprising as in the high melt strength (HMS) post-reactor modification processes described in EP 3 018 153 A1 and EP 3 018 154 A1 an increase of the melt flow rate MFR$_2$ (230° C., 2.16 kg) of the resulting propylene polymer composition compared to the reactor based propylene polymer has been observed. This surprising finding allows a broader spectrum of MFR ranges of the recovered propylene copolymer of process step b) and as a consequence milder melt mixing conditions due to the possibility of using propylene copolymers with a higher MFR.

It is preferred that the recovered propylene polymer composition comprises at least 95.0 wt %, more preferably at least 99.0 wt %, most preferably at least 99.005 wt %, of the propylene polymer which has been long chain branched in process step c).

Preferably the recovered propylene polymer composition of process step d) of the process according to the invention refers to the propylene polymer compositions according to the present invention with all the properties as described above or below.

Article

The present invention further relates to an article comprising the propylene polymer composition as defined above or below.

The article is preferably selected from films, foams and moulded articles especially in light weight applications, automotive applications and packaging applications, such as food packaging applications.

Preferably the article of the invention comprises at least 70.0 wt %, more preferably at least 80.0 wt %, most preferably at least 90.0 wt %, still most preferably at least 95.0 wt %, of the propylene polymer composition according to the invention. The above given weight percent (wt %) is calculated based on the total of thermoplastic material comprised in the article. In a preferred embodiment the article consists of the propylene polymer composition according to the invention.

The processes for preparing the films, foams and moulded articles comprising the propylene polymer composition according to the present invention are generally known in the art.

Use

The present invention further relates to the use of the propylene polymer composition as defined above or below for the production of an article.

Said article is preferably selected from films, foams and moulded articles especially in light weight applications, automotive applications and packaging applications, such as food packaging applications as described above or below.

Finally, the present invention relates to the use of the process as defined above or below for increasing the melt strength of a propylene polymer composition.

Preferably, said propylene polymer composition refers to the propylene polymer composition according to the present invention with all the properties as described above or below.

EXAMPLES

1. Determination Methods a) Melt Flow Rate

The melt flow rate (MFR) is determined according to ISO 1133 and is indicated in g/10 min. The MFR is an indication of the flowability and hence the processability of the polymer. The higher the melt flow rate, the lower the viscosity of the polymer. The MFR$_2$ of polypropylene is determined at a temperature of 230° C. and under a load of 2.16 kg.

b) Particle Size/Particle Size Distribution

A sieve analysis according to ISO 3310 was performed on the polymer samples. The sieve analysis involved a nested column of sieves with wire mesh screen with the following sizes: >20 μm, >32 μm, >63 μm, >100 μm, >125 μm, >160 μm, >200 μm, >250 μm, >315 μm, >400 μm, >500 μm, >710 μm, >1 mm, >1.4 mm, >2 mm, >2.8 mm. The samples were poured into the top sieve which has the largest screen openings. Each lower sieve in the column has smaller openings than the one above (see sizes indicated above). At the base is the receiver. The column was placed in a mechanical shaker. The shaker shook the column. After the shaking was completed the material on each sieve was weighed. The weight of the sample of each sieve was then divided by the total weight to give a percentage retained on each sieve. The particle size distribution and the characteristic median particle size d50 as well as the top-cut particle size d95 were determined from the results of the sieve analysis according to ISO 9276-2.

c) XHU Fraction. Gel Content

The xylene hot insoluble (XHU) fraction is determined according to EN 579. About 2.0 g of the polymer ($m_p$) are weighted and put in a mesh of metal which is weighted, the total weight being represented by ($m_{p+m}$). The polymer in the mesh is extracted in a soxhlet apparatus with boiling xylene for 5 hours. The eluent is then replaced by fresh xylene and boiling is continued for another hour. Subsequently, the mesh is dried and weighted again ($m_{XHU+m}$). The mass of the xylene hot insoluble ($m_{XHU}$) obtained by the formula $m_{XHU+m}-m_m=m_{XHU}$ is put in relation to the weight of the polymer ($m_p$) to obtain the fraction of xylene insolubles $m_{XHU}/m_p$.

d) F30 Melt Strength and v30 Melt Extensibility

The test described herein follows ISO 16790:2005. The strain hardening behaviour is determined by the method as described in the article "Rheotens-Mastercurves and Drawability of Polymer Melts", M. H. Wagner, Polymer Engineering and Science, Vol. 36, pages 925 to 935. The strain hardening behaviour of polymers is analysed with a Rheotens apparatus (product of Gottfert, Siemensstr.2, 74711 Buchen, Germany) in which a melt strand is elongated by drawing down with a defined acceleration. The Rheotens experiment simulates industrial spinning and extrusion processes. In principle a melt is pressed or extruded through a round die and the resulting strand is hauled off. The stress on the extrudate is recorded as a function of melt properties and measuring parameters (especially the ratio between output and haul-off speed, practically a measure for the extension rate).

For the results presented below, the materials were extruded with a lab extruder HAAKE Polylab system and a gear pump with cylindrical die (L/D=6.0/2.0 mm). The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero). Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sec$^2$. The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the F30 melt strength and drawability values.

e) Xylene Cold Soluble Fraction (XCS, wt %)

The amount of the polymer soluble in xylene is determined at 25.0° C. according to ISO 16152; 5$^{th}$ edition; 2005-07-01.

f) Melting Temperature

The melting temperature, $T_m$, is determined by differential scanning calorimetry (DSC) according to ISO 11357-3 with a TA-Instruments 2920 Dual-Cell with RSC refrigeration apparatus and data station. A heating and cooling rate of 10° C./min is applied in a heat/cool/heat cycle between +23 and +210° C. The crystallization temperature ($T_c$) is determined from the cooling step while melting temperature ($T_m$) and melting enthalpy ($H_m$) are being determined in the second heating step.

g) Porosity and Specific Pore Volume

The porosity and the specific pore volume of the polymer are measured by mercury porosimetry according to DIN 66133 in combination with helium density measurement according to DIN 66137-2. The samples were first dried for 3 hours at 70° C. in a heating cabinet then stored in an exsiccator until the measurement. The pure density of the samples was determined on milled powder using helium at 25° C. in a Quantachrome Ultrapyknometer 1000-T (DIN 66137-2). Mercury porosimetry was performed on non-milled powder in a Quantachrome Poremaster 60-GT in line with DIN 66133.

The porosity is calculated by equation (II) like:

$$\text{Porosity [\%]} = \left[\text{specific pore volume} \bigg/ \left(\text{specific pore volume} + \frac{1}{\text{density}}\right)\right] * 100 \quad (II)$$

h) Quantification of Copolymer Microstructure by $^{13}$C-NMR Spectroscopy

Quantitative nuclear-magnetic resonance (NMR) spectroscopy was used to quantify the comonomer content of the polymers.

Quantitative $^{13}$C{$^1$H} NMR spectra recorded in the molten-state using a Bruker Avance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification (Klimke, K., Parkinson, M., Piel, C., Kaminsky, W., Spiess, H. W., Wilhelm, M., Macromol. Chem. Phys. 2006; 207:382.; Parkinson, M., Klimke, K., Spiess, H. W., Wilhelm, M., Macromol. Chem. Phys. 2007; 208:2128.; Castignolles, P., Graf, R., Parkinson, M., Wilhelm, M., Gaborieau, M., Polymer 50 (2009) 2373). Standard single-pulse excitation was employed utilising the NOE at short recycle delays of 3s (Pollard, M., Klimke, K., Graf, R., Spiess, H. W., Wilhelm, M., Sperber, O., Piel, C., Kaminsky, W., Macromolecules 2004; 37:813.; Klimke, K., Parkinson, M., Piel, C., Kaminsky, W., Spiess, H. W., Wilhelm, M., Macromol. Chem. Phys. 2006; 207:382.) and the RS-HEPT decoupling scheme (Filip, X., Tripon, C., Filip, C., J. Mag. Resn. 2005, 176, 239.; Griffin, J. M., Tripon, C., Samoson, A., Filip, C., and Brown, S. P., Mag. Res. in Chem. 2007 45, S1, S198). A total of 16384 (16k) transients were acquired per spectra.

Quantitative $^{13}$C{$^1$H} NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount 1-hexene incorporated in PPHPP isolated sequences was quantified using the integral of the αH2 sites at 44.2 ppm accounting for the number of reporting sites per comonomer:

$$H = I\alpha/2$$

With no other signals indicative of other comonomer sequences, i.e. consecutive comonomer incorporation, observed the total 1-hexene comonomer content was calculated based solely on the amount of isolated 1-hexene sequences:

$$H_{total} = H$$

The amount of propene was quantified based on the main Sαα methylene sites at 46.7 ppm and compensating for the relative amount of αB2 and ααB2B2 methylene unit of propene not accounted for (note B and BB count number of butane monomers per sequence not the number of sequences):

$$P_{total} = I_s\alpha\alpha + H$$

With characteristic signals corresponding to regio defects observed (Resconi, L., Cavallo, L., Fait, A., Piemontesi, F., Chem. Rev. 2000, 100, 1253), the compensation for misinserted propylene units was used for Ptotal.

In case of 2,1-erythro mis-insertions presence the signal from ninth carbon ($S_{21e9}$) of this microstructure element (Resconi, L., Cavallo, L., Fait, A., Piemontesi, F., Chem. Rev. 2000, 100, 1253) with chemical shift at 42.5 ppm was chosen for compensation. In this case:

$$P_{total} = I_s\alpha\alpha + H + 3*I(S_{21e9})$$

The total mole fraction of 1-hexene in the polymer was then calculated as:

$$fH = (H_{total})/(H_{total} + P_{total})$$

The total comonomer incorporation of 1-hexene in mole percent was calculated from the mole fraction in the usual manner:

$$H \text{ [mol \%]} = 100*fH$$

The total comonomer incorporation of 1-hexene in weight percent was calculated from the mole fraction in the standard manner:

$$H[\text{wt \%}] = 100*(fH*84.17)/((fH*84.17) + ((1-fH)*42.08))$$

2. Preparation of the Propylene Polymers a) Preparation of the Single Site Catalyst System 1

Catalyst Complex

The catalyst complex used in the polymerization processes for propylene copolymer PP-1 used for the inventive examples IE1 and IE2 as well as for comparative example CE1 was:

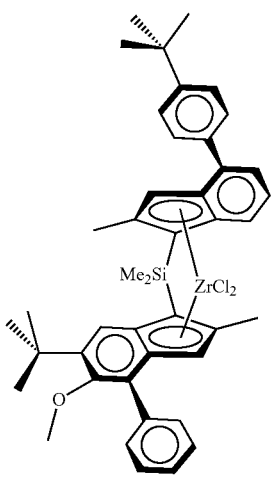

The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride) has been synthesized as described in WO 2013/007650, E2.

The catalyst system was prepared using metallocene MC1 and a cocatalyst system of MAO. The catalyst was supported onto silica.

Preparation of the MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (7.4 kg) was added from a feeding drum followed by careful pressuring and depressurising with nitrogen using manual valves. Then toluene (32.2 kg) was added. The mixture was stirred (40 rpm) for 15 min. Next 30 wt % solution of MAO in toluene (17.5 kg) from Lanxess was added via 12 mm line on the top of the reactor within 70 min. The reaction mixture was then heated up to 90° C. and stirred at 90° C. for additional two hours. The slurry was allowed to settle and the mother liquor was filtered off. The MAO treated silica support was washed twice with toluene (32.2 kg) at 90° C., following by settling and filtration. The reactor was cooled off to 60° C. and the solid was washed with heptane (32.2 kg). Finally MAO treated $SiO_2$ was dried at 60° C. for 2 h under nitrogen flow 2 kg/h, pressure 0.3 barg and then for 5 hours under vacuum (−0.5 barg) with stirring at 5 rpm. MAO treated support was collected as a free-flowing white powder found to contain 12.7% Al by weight.

Preparation of the Single Site Catalyst System 1:

In a nitrogen filled glovebox, a solution of MAO 0.25 mL (30% wt in toluene, AXION 1330 CA Lanxess) in dry toluene (1 mL) was added to an aliquot of metallocene MC1 (30.0 mg, 38 μmol). The mixture was stirred for 60 minutes at room temperature. Next, the solution was slowly added to 1.0 g of MAO treated silica prepared as described above, which was placed in a glass flask. The mixture was allowed to stay overnight, washed with 5 mL of toluene and was then subjected to vacuum drying for 1 hour to yield pink free-flowing powder to yield 1.1 g of the catalyst as pink free flowing powder.

The catalyst system 1 has an Al content of 12.5 wt %, a Zr content of 0.248 wt % and a molar Al/Zr ratio of 170 mol/mol.

b) Preparation of the Ziegler-Natta Catalyst System 2

The Ziegler-Natta catalyst system used in the polymerization processes for propylene copolymer PP-1 used for the comparative example CE2 was prepared as follows: 3.4 litre of 2-ethylhexanol and 810 ml of propylene glycol butyl mono-ether (in a molar ratio 4/1) were added to a 20 l reactor. Then 7.8 litre of a 20% solution in toluene of BEM (butyl ethyl magnesium) provided by Crompton GmbH, were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25° C. Mixing speed was adjusted to 170 rpm. 26.0 g of the Mg-complex prepared above was added within 30 minutes keeping the temperature at 25° C. 3.0 ml of Viscoplex® 1-254 and 1.0 ml of a toluene solution with 2 mg Necadd 447™ was added. Then 24.0 ml of heptane was added to form an emulsion. Mixing was continued for 30 minutes at 25° C., after which the reactor temperature was raised to 90° C. within 30 minutes. The reaction mixture was stirred for a further 30 minutes at 90° C. Afterwards stirring was stopped and the reaction mixture was allowed to settle for 15 minutes at 90° C. The solid material was washed 5 times: washings were made at 80° C. under stirring for 30 min with 170 rpm. After stirring was stopped the reaction mixture was allowed to settle for 20-30 minutes and followed by siphoning.

Wash 1: washing was made with a mixture of 100 ml of toluene and 1 ml donor

Wash 2: washing was made with a mixture of 30 ml of TiCl4 and 1 ml of donor.

Wash 3: washing was made with 100 ml of toluene.

Wash 4: washing was made with 60 ml of heptane.

Wash 5: washing was made with 60 ml of heptane during 10 minutes of stirring.

Afterwards stirring was stopped and the reaction mixture was allowed to settle for 10 minutes while decreasing the temperature to 70° C. with subsequent siphoning, followed by N2 sparging for 20 minutes to yield an air sensitive powder.

c) Polymerization of Propylene Polymer PP-1

Propylene polymer PP-1 has been produced in a Borstar® plant with a prepolymerization reactor, one slurry loop reactor and one gas phase reactor in the presence of the single site catalyst system 1. The feeds and polymerization conditions in the different polymerization conditions are listed in Table 1.

TABLE 1

| Polymerization conditions of PP-1 | | |
|---|---|---|
| | | PP-1 |
| Prepolymerization | | |
| Temperature | ° C. | 25 |
| Pressure | kPa | 5120 |
| Catalyst feed | g/h | 8.2 |
| H₂ feed | g/h | 0.10 |

TABLE 1-continued

Polymerization conditions of PP-1

|  |  | PP-1 |
|---|---|---|
| Loop (Reactor 1) | | |
| Temperature | °C. | 65 |
| Pressure | kPa | 5079 |
| $H_2/C_3$ ratio | mol/kmol | 0.10 |
| $C_6/C_3$ ratio | mol/kmol | 45.3 |
| Liquid residence time | h | 0.37 |
| Loop reactor split | wt % | 37 |
| $MFR_2$ | g/10 min | 6.4 |
| $C_6$ content loop fraction | wt % | 1.3 |
| GPR (Reactor 2) | | |
| Temperature | °C. | 80 |
| Pressure | kPa | 2400 |
| $H_2/C_3$ ratio | mol/kmol | 1.1 |
| $C_6/C_3$ ratio | mol/kmol | 5.0 |
| Polymer residence time | h | 2.5 |
| GPR reactor split | wt% | 63 |
| $C_6$ content GPR fraction | wt % | 4.3 |
| Polymer properties | | |
| XCS | wt % | 0.9 |
| $MFR_2$ | g/10 min | 5.5 |
| $C_6$ content | wt % | 3.2 |
| Tm | °C. | 140 | d) Polymerization of Propylene Homopolymer PP-2

Propylene polymer PP-2 was produced in a pilot plant with a prepolymerization reactor, one slurry loop reactor and one gas phase reactor. The Ziegler-Natta catalyst system 2 described above was used along with triethyl-aluminium (TEAL) as co-catalyst and dicyclo pentyl dimethoxy silane (D-donor) as external donor. The co-catalyst to donor ratio, the co-catalyst to titanium ratio and the polymerization conditions are indicated in Table 2.

TABLE 2

Polymerization conditions

|  |  | PP-2 |
|---|---|---|
| Polymerization | | |
| Co/ED ratio | mol/mol | 20.1 |
| Co/Ti ratio | mol/mol | 367.6 |
| Loop (Reactor 1) | | |
| Time | h | 0.5 |
| Temperature | °C. | 75 |
| $MFR_2$ | g/10 min | 5.3 |
| XCS | wt.-% | 2.0 |
| $C_2$ content | wt.-% | 0.0 |
| $H_2/C_3$ ratio | mol/kmol | 1.1 |
| $C_2/C_3$ ratio | mol/kmol | 0 |
| amount | wt.-% | 43 |
| GPR (Reactor 2) | | |
| Time | h | 2.0 |
| Temperature | °C. | 80 |
| Pressure | kPa | 2600 |
| $MFR_2$ | g/10 min | 6.2 |
| $C_2$ content | wt.-% | 0.0 |
| $H_2/C_3$ ratio | mol/kmol | 15.7 |
| $C_2/C_3$ ratio | mol/kmol | 0.0 |
| amount | wt.-% | 57 |
| Polymer properties | | |
| XCS | wt % | 1.7 |
| $MFR_2$ | g/10 min | 5.8 |
| $T_m$(DSC) | °C. | 164 | e) Properties of the Polymer Powders of PP-1 and PP-2

The reactor-made polymer powders and the polymers of PP-1 and PP-2 have the following properties as disclosed in Table 3 below.

TABLE 3

Properties of the polymer powders and polymers of PP-1 and PP-2

|  |  | PP-1 | PP-2 |
|---|---|---|---|
| Powder properties | | | |
| porosity | % | 1.9 | 11.5 |
| specific pore volume | cm$^3$/g | <0.01 | 0.16 |
| median particle size d50 | μm | 340 | 640 |
| top-cut particle size d95 | μm | 790 | 920 |
| Polymer properties | | | |
| Comonomer content | wt % | 3.2 | 0 |
| XCS | wt % | 0.9 | 2.3 |
| $MFR_2$ | g/10 min | 5.5 | 3.2 |
| $T_m$(DSC) | °C. | 140 | 159 |

3. Reactive Modification

For the preparation of the propylene polymer compositions of inventive examples IE1 and IE2 and Comparative example CE2 the propylene polymers PP-1 and PP-2 were subjected to reactive modification using Perkadox 24L (Dicetyl peroxydicarbonate, commercially available from AkzoNobel Polymer Chemistry) as peroxide. No bifunctional agent was premixed to the propylene polymers as disclosed e.g. in EP 3 018 153 A1 and EP 3 018 154 A1. Instead the propylene polymer and the peroxide were mixed together in a melt mixing step with an additive package of antioxidant Irganox B 215 (commercially available from BASF SE), and Calcium stearate and acid scavenger ADK STAB HT (commercially available from Adeka Palmarole) in a co-rotating twin screw extruder of the type Coperion ZSK18 having a barrel diameter of 18 mm and an L/D-ratio of 40 equipped with a high intensity mixing screw having two kneading zones and a vacuum degassing setup. A melt temperature profile with initial temperature T1=180° C. in the feed zone, mid temperature T2=200° C. in the last kneading zone and a final temperature T3=230° C. in the die zone, all temperatures being defined as barrel temperature, was selected. The screw speed was set at 400 rpm.

For the preparation of the propylene polymer compositions of comparative example CE1 the propylene polymer PP-1 was melt mixed as described above without reactive modification.

Following the melt-mixing step, the resulting polymer melt was pelletized after solidification of the strands in a water bath in a strand pelletizer at a water temperature of 40° C. Reaction conditions and properties of the resulting propylene polymer compositions are summarized in Table 4.

TABLE 4

Melt mixing conditions and properties of the propylene polymer compositions

|  |  | CE1 | IE1 | IE2 | CE2 |
|---|---|---|---|---|---|
| Base polymer powder | | PP-1 | PP-1 | PP-1 | PP-2 |
| Polymer powder | wt % | 99.7 | 98.7 | 98.2 | 98.2 |
| Antioxidant | wt % | 0.2 | 0.2 | 0.2 | 0.2 |
| Ca-Stearat | wt % | 0.05 | 0.05 | 0.05 | 0.05 |
| Acid scavenger | wt % | 0.05 | 0.05 | 0.05 | 0.05 |
| POX Level | wt % | 0 | 0.6 | 1.5 | 1.5 |

TABLE 4-continued

Melt mixing conditions and properties of the propylene polymer compositions

| Base polymer powder | | CE1<br>PP-1 | IE1<br>PP-1 | IE2<br>PP-1 | CE2<br>PP-2 |
|---|---|---|---|---|---|
| Process data | | | | | |
| Screw speed | rpm | 400 | 400 | 400 | 400 |
| Throughput | kg/h | 7 | 7 | 7 | 7 |
| Barrel temperature | °C. | 200 | 200 | 200 | 200 |
| Composition properties | | | | | |
| MFR$_2$ | g/10 min | 12.8 | 7.8 | 4.0 | 4.7 |
| F30 | cN | 1.8 | 6.5 | 16.2 | 9.5 |
| v30 | mm/s | 65 | 219 | 246 | 230 |
| XHU | wt % | 0.08 | 0.34 | 0.34 | 0.14 |
| XCS | wt % | 0.9 | 1.0 | 1.1 | 1.9 |
| Tm | °C. | 140 | 139 | 139 | 166 |
| Tc | °C. | 106 | 105 | 108 | 132 |
| Hm | J/g | 92 | 90 | 90 | 117 |

It can be seen that by means of the simplified reactive modification process propylene polymer compositions comprising a long chain branched propylene/1-hexene copolymer can be obtained which shows an improved balance of properties in regard of low melting and crystallization temperatures and high melt strength. The reactive modification process decreases the melt flow rate of the propylene polymer composition, which is especially beneficial for moulding applications as it allows the use of propylene base polymers with higher melt flow rate.

The invention claimed is:

1. A process for producing a propylene polymer composition comprising a long chain branched propylene copolymer, wherein the propylene polymer composition has
    a) a crystallization temperature Tc of less than 115° C., determined by DSC according to ISO 11357-3,
    b) a melting temperature Tm of less than 155° C., determined by DSC according to ISO 11357-3,
    c) a F39 melt strength of from 5.0 to less than 30.0 cN, determined following ISO 16790:2005, and
    d) a V30 melting extensibility of more than 190 mm/s, determined following ISO 16790:2005,
    wherein the process comprises the following steps:
    a) Polymerizing propylene and comonomers selected from alpha-olefins having from 4 to 12 carbon atoms in the presence of a single site catalyst system to produce a propylene copolymer;
    b) Recovering the propylene copolymer;
    c) Extruding the propylene copolymer in the presence of a peroxide for introducing long chain branching into the propylene copolymer;
    d) Recovering the propylene polymer composition.

2. The process according to claim 1, wherein the single site catalyst system comprises
    (i) a metallocene complex of formula (I):

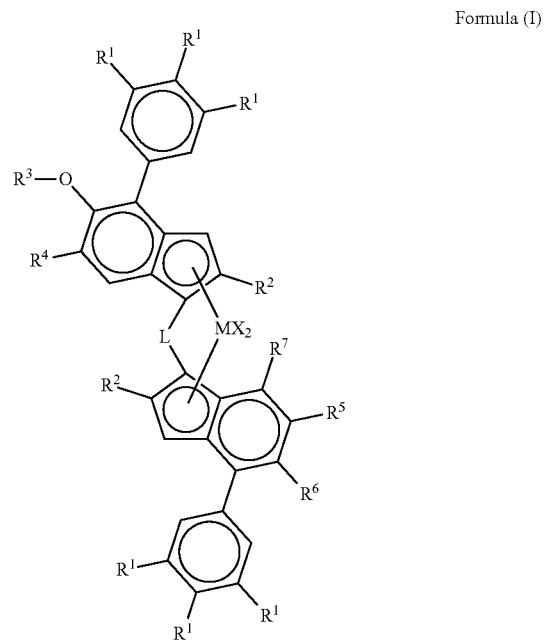

Formula (I)

wherein
    M is Zr or Hf
    each X independently is a sigma-donor ligand,
    L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a C$_1$-C$_{20}$-hydrocarbyl group optionally containing one or more heteroatoms of Group 14-16 of the periodic table or fluorine atoms, or optionally two R' groups taken together can form a ring,
    each R$^1$ are independently the same or can be different and are hydrogen, a linear or branched C$_1$-C$_6$-alkyl group, a C$_{7-20}$-arylalkyl, C$_{7-20}$-alkylaryl group or C$_{6-20}$-aryl group or an OY group, wherein Y is a C$_{1-10}$-hydrocarbyl group, and optionally two adjacent R$^1$ groups can be part of a ring including the phenyl carbons to which they are bonded,
    each R$^2$ independently are the same or can be different and are a CH$_2$—R$^8$ group, with R$^8$ being H or linear or branched C$_{1-6}$-alkyl group, C$_{3-8}$-cycloalkyl group, C$_{6-10}$-aryl group,
    R$^3$ is a linear or branched C$_1$-C$_6$-alkyl group, C$_{7-20}$-arylalkyl, C$_{7-20}$-alkylaryl group or C$_6$-C$_{20}$-aryl group,
    R$^4$ is a C(R$^9$)$_3$ group, with R$^9$ being a linear or branched C$_1$-C$_6$-alkyl group,
    R$^5$ is hydrogen or an aliphatic C$_1$-C$_{20}$-hydrocarbyl group optionally containing one or more heteroatoms from groups 14-16 of the periodic table of elements;
    R$^6$ is hydrogen or an aliphatic C$_1$-C$_{20}$-hydrocarbyl group optionally containing one or more heteroatoms from groups 14-16 of the periodic table of elements; or
    R$^5$ and R$^6$ can be joined as part of a 5-membered ring condensed with the indenyl, which is optionally substituted by n groups R$^{10}$, n being from 0 to 4;

each $R^{10}$ is same or different and may be a $C_1$-$C_{20}$-hydrocarbyl group, or a $C_1$-$C_{20}$-hydrocarbyl radical optionally containing one or more heteroatoms belonging to groups 14-16 of the periodic table of elements;

$R^7$ is H or a linear or branched $C_1$-$C_6$-alkyl group or an aryl or heteroaryl group having 6 to 20 carbon atoms optionally substituted by one to three groups $R^{11}$, each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, (ii) a cocatalyst system comprising an aluminoxane cocatalyst, and (iii) a silica support.

3. The process according to claim 1, wherein the amount of comonomer units in the polymerization step a) is from more than 0.5 wt % to 10.0 wt %, based on the total amount of monomer units in the propylene copolymer, determined by quantitative $^{13}$C-NMR spectroscopy.

4. The process according to claim 1, wherein the particles of the recovered propylene copolymer have a porosity of less than 10.0%, and/or a specific pore volume of less than 0.12 cm$^3$/g, determined by mercury porosimetry according to DIN 661133 in combination with helium density measurement according to DIN 66137-2.

5. The process according to claim 1, wherein the particles of the recovered propylene copolymer has a median particle size d50 of from 150 to 1000 μm, determined by sieve analysis according to ISO 3310.

6. The process according to claim 1, wherein the propylene copolymer and the peroxide are melt mixed in a melt mixing device at a barrel temperature in the range of 160 to 280° C.

7. The process according to claim 1, wherein the peroxide has a half-time ($t_{1/2}$) of not more than 6 min at a melt temperature of 160 to 280° C. and/or the peroxide is added to the propylene copolymer in an amount of 0.40 to 4.00 parts per weight (ppw) of peroxide per 100 parts per weight of propylene copolymer.

8. The process according to claim 1, wherein the long chain branching is introduced into the propylene copolymer in the absence of a bifunctional long chain branching agent.

9. The process according to claim 1, wherein the recovered propylene polymer composition of process step d) has a lower melt flow rate MFR$_2$ (230° C., 2.16 kg) compared to the recovered propylene polymer of process step b).

10. An article comprising the propylene polymer composition produced according to the process according to claim 1.

* * * * *